(12) United States Patent
Sun et al.

(10) Patent No.: US 8,072,932 B2
(45) Date of Patent: Dec. 6, 2011

(54) METHOD, DEVICE, AND TERMINAL FOR PHYSICAL LAYER RANDOM ACCESS IN WIDEBAND TDD MOBILE COMMUNICATION SYSTEM

(75) Inventors: Shaohui Sun, Shanghai (CN); Yingmin Wang, Qingpu District (CN); Libo Wang, Qingpu District (CN); Hai Bi, Qingpu District (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 643 days.

(21) Appl. No.: 12/161,310

(22) PCT Filed: Jan. 4, 2007

(86) PCT No.: PCT/CN2007/000015
§ 371 (c)(1),
(2), (4) Date: Jul. 17, 2008

(87) PCT Pub. No.: WO2007/082458
PCT Pub. Date: Jul. 26, 2007

(65) Prior Publication Data
US 2010/0226295 A1 Sep. 9, 2010

(30) Foreign Application Priority Data
Jan. 17, 2006 (CN) .......................... 2006 1 0005674

(51) Int. Cl.
*H04Q 7/00* (2006.01)
(52) U.S. Cl. ........ 370/330; 370/337; 370/344; 370/442; 370/478; 370/480
(58) Field of Classification Search .......... 370/279–281, 370/319, 321, 344, 345, 347, 442, 458, 462, 370/480, 330, 478; 455/450–452.2, 509, 455/512
See application file for complete search history.

(56) References Cited

U.S. PATENT DOCUMENTS
6,185,409 B1  2/2001  Threadgill et al.
(Continued)

FOREIGN PATENT DOCUMENTS
| CN | 1497882 | 5/2004 |
|---|---|---|
| CN | 1779932 | 1/2006 |
| JP | 2003-524985 | 8/2003 |
| KR | 20020039122 | 5/2002 |

OTHER PUBLICATIONS

International Search Report issued on May 3, 2007 for PCT/CN2007/000015 (with English translation) 4 pages.

(Continued)

*Primary Examiner* — Pao Sinkantarakorn
(74) *Attorney, Agent, or Firm* — Fulbright & Jaworski L.L.P.

(57) ABSTRACT

A method for physical layer random access in wideband TDD mobile communication system is disclosed, and the method comprises: receiving the system broadcast message of the cell, obtaining the configuration information of the frequency band in frequency domain in the UpPTS time slot of the cell; and the terminal sends random access sequences to the BS in the UpPTS time slot according to the configuration information of the frequency band in the UpPTS time slot. The configuration information of the frequency band in frequency domain in the UpPTS time slot comprises the information about the frequency band number that the total bandwidth used is divided in the UpPTS time slot, the information about the bandwidth size of each frequency band, and the information about the position of the frequency point. Phod, device and terminal for physical layer random access in wideband TDD mobile communication system provided in the present invention can use the frequency bands whose time slots are different to perform network access, which can reduce the competition and collision probability when sending random access sequences, and can realize an efficient random access procedure.

17 Claims, 5 Drawing Sheets

U.S. PATENT DOCUMENTS

| | | | | |
|---|---|---|---|---|
| 2003/0031148 A1* | 2/2003 | Schmidt et al. | ............... | 370/347 |
| 2003/0076812 A1* | 4/2003 | Benedittis | ..................... | 370/350 |
| 2005/0271009 A1* | 12/2005 | Shirakabe et al. | ............ | 370/329 |
| 2007/0081604 A1* | 4/2007 | Khan et al. | .................... | 375/261 |

OTHER PUBLICATIONS

NTT DoCoMo et al., "Physical Channels and Multiplexing in Evolved UTRA Uplink", 3GPP Draft, R1-050850, 14 pages, Sep. 2, 2005.

3rd Generation Partnership Project: "Physical Layer Aspects for Evolved UTRA (Release 7)", TR 25.814. V1.0.1, Nov. 2005, 74 pages. (part I—pp. 1-36; Part II—pp. 37-72).

Extended European Search Report issued for EP 07701947.9-2415, dated Mar. 11, 2010, 11 pages.

Office Action issued for Korean Patent Application No. 10-2008-7020180, issued on Oct. 28, 2010, 9 pages with English language translation.

* cited by examiner

METHOD, DEVICE, AND TERMINAL FOR PHYSICAL LAYER RANDOM ACCESS IN WIDEBAND TDD MOBILE COMMUNICATION SYSTEM

This application claims priority to Chinese Patent Application No. 200610005674.6, entitled "A METHOD FOR PHYSICAL LAYER RANDOM ACCESS IN WIDEBAND TDD MOBILE COMMUNICATION SYSTEM", and filed with the Chinese Patent Office on Jan. 17, 2006, which is hereby incorporated by reference in its entirety.

FIELD OF THE INVENTION

The present invention relates to the mobile communication field and in particular to a method, device and terminal for physical layer random access in a wideband time division duplex mobile communication system.

BACKGROUND OF THE INVENTION

Among the three predominant international standards for the 3-rd generation mobile communication system, the TD-SCDMA is the only one which adopts the Time Division Duplex (TDD). The TD-SCDMA supports asymmetric service transmission in the uplink and downlink and has more flexibility with respect to the utilization of the frequency spectrum.

Figure 1:
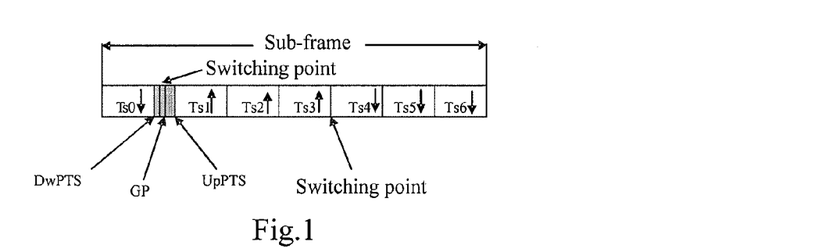
FIG. 1 illustrates a structural form of a frame in the existing TD-SCDMA and its evolvement system.

An existing TD-SCDMA system is a system provided with a chip rate of 1.28 Mcps and a bandwidth of 1.6 MHz. The same signal format is used for a data part and uplink and downlink pilot parts of the system. FIG. 1 illustrates a structural form of a frame in the existing TD-SCDMA system. In FIG. 1, each sub-frame is further divided into seven normal timeslots and three special timeslots. The three special timeslots are DwPTS, GP and UpPTS, respectively. Among the seven normal timeslots, TS0 is usually allocated to the downlink while TS1 is usually allocated to the uplink. An uplink timeslot and a downlink timeslot are separated with a transition point. The DwPTS timeslot is intended for transmission of a downlink pilot for an initial search in a cell, the UpPTS is intended for transmission of an uplink access timeslot for a random access signal, and the GP acts as a guard interval for transition of the downlink timeslot to the uplink timeslot to prevent mutual interference between uplink and downlink channels and has a length which determines the maximum of a coverage radius of the cell.

In the prior art, terminals enable a random access by sending a random access sequence in the UpPTS timeslot, and the random access sequence may vary from one terminal to another. However, the terminals of all users have to occupy the same frequency band during transmission of the uplink random access sequence due to the bandwidth limitation of the TD-SCDMA system.

With the development of technology, people who pose increasingly higher demands on mobile communication wish the system to provide data transmission services with a large capacity, a high rate and a low time delay. In order to cater to the increasingly growing demands, the TD-SCDMA system has to evolve and improve the performance continuously. A technical standard for the TD-SCDMA evolution system is currently being established in the Long Term Evolution (LTE) research project under the 3GPP organization, and this technical standard is also becoming a predominant technology for the LTE TDD system. A system enabling a service with a high rate, a large capacity and a broader occupied bandwidth has been proposed in the evolvement solution of the TD-SCDMA and is referred to as a wideband time division duplex cellular system. In the wideband time division duplex cellular system, the bandwidth can be up to 200 MHz or more, and a terminal can be supported to operate over a frequency band of 1.25 MHz, 2.5 MHz, 5 MHz, 10 MHz and 20 MHz.

Random access is an important function of a cellular mobile communication system. The purpose of the random access is to enable an efficient access of a terminal device in a cellular network to the cellular network, accomplishing allocation of a transmission channel and communication transmission of data. In the TD-SCDMA and its evolvement system, a terminal can accomplish synchronization with the system and power control by a random access. Further for the TD-SCDMA evolvement system, with the random access, the terminal can adjust the time to transmit data in accordance with a distance from a base station so as to control the synchronization precision within a cyclic prefix (CP) length, thereby reducing mutual interference between the terminal and other terminals. Meanwhile, the random access enables the base station to control the power of the terminal to transmit a signal in accordance with the distance from the terminal so as to reduce interference between cells. The random access is a principal step for the terminal to communicate, and the terminal gains an access to the cellular network system through this process to obtain an uplink channel resource for transmission.

In the wideband time division duplex cellular system, if the random access is implemented by the code division multiple access in the existing TD-SCDMA system, the increased number of access users may result in a problem that the probability of collision of the random sequences increases since the users may select the same random sequence. Furthermore, serious interference between terminals may arise because all the users occupy the same channel resource. Consequently, how to determine a random access mechanism and design a random access channel is a pressing technical problem to be solved.

SUMMARY OF THE INVENTION

In view of the drawback in the prior art that the probability of collision of the random sequences increases since the users may select the same random sequence, the invention provides a method, device and terminal for terminal physical layer random access in a wideband time division duplex mobile communication system to reduce the probability of collision and the interference.

In order to solve the above problem, according to embodiments of the invention, there is provided a method for physical layer random access in a wideband time division duplex mobile communication system including:

a) receiving a system broadcast message of a cell, and obtaining frequency band configuration information on an UpPTS timeslot of the cell in the frequency domain;

b) transmitting a random access sequence to a base station in the UpPTS timeslot in accordance with the frequency band configuration information on the UpPTS timeslot during a random access; and c) retransmitting the random access sequence if no response message from the base station is received within a predetermined period; and proceeding with a subsequent processing flow for the random access if a response message is received within the predetermined period.

According to embodiments of the invention, there is provided a device for physical layer random access in a wideband time division duplex mobile communication system including:

an information obtaining unit adapted to receive a system broadcast message of a cell and to obtain frequency band configuration information on an UpPTS timeslot of the cell in the frequency domain;

an access sequence transmitting unit adapted to transmit a random access sequence to a base station in the UpPTS timeslot in accordance with the frequency band configuration information on the UpPTS timeslot in the frequency domain obtained from the information obtaining unit; and a network accessing unit adapted to receive a response message from the base station; and if no response message from the base station is received within a predetermined period, a terminal retransmits the random access sequence, and if a response message is received within the predetermined period, the terminal proceeds with a subsequent processing flow for the random access.

According to embodiments of the invention, there is provided a terminal for a wideband time division duplex mobile communication system, including a physical layer random access device including:

an information obtaining unit adapted to receive a system broadcast message of a cell and to obtain frequency band configuration information on an UpPTS timeslot of the cell in the frequency domain;

an access sequence transmitting unit adapted to transmit a random access sequence to a base station in the UpPTS timeslot in accordance with the frequency band configuration information on the UpPTS timeslot in the frequency domain obtained from the information obtaining unit; and a network accessing unit adapted to receive a response message from the base station; and if no response message from the base station is received within a predetermined period, the terminal retransmits the random access sequence, and if a response message is received within the predetermined period, the terminal proceeds with a subsequent processing flow for the random access.

The invention has the following advantages over the prior art.

The method for physical layer random access in a wideband time division duplex mobile communication system according to embodiments of the invention enables different terminals to use different frequency bands since the cell divides the uplink random access channel into several parts in the frequency domain, thereby reducing the probability of competition and collision of the random access sequences transmitted by the terminals, reducing the time required for the access, lowering power consumption of the terminal, and implementing an efficient and rapid random access.

Furthermore, the invention provides an unprecedented method for physical layer random access with use of the DFT-s OFDM single carrier multiple access in the TDD system.

DETAILED DESCRIPTION OF THE INVENTION

During the transition of the TD-SCDMA system to the wideband time division duplex cellular system, the existing TD-SCDMA system with a bandwidth of 1.6 MHz may share some frequency bands with its evolvement system, and base stations of the systems may need to be co-located. In order for coexistence of the TD-SCDMA evolvement system, i.e. the wideband time division duplex mobile communication system according to the invention and the existing TD-SCDMA system, a preferable option is to make frame structures of the two systems consistent in so far as possible. FIG. 1 illustrates a schematic diagram of the same frame structure used for the two systems, and reference can be made to various disclosed documents or technical references of standards for names and functions of specific timeslots. It shall be appreciated that the invention is not limited to the above frame structure, such as parameters of the number and the length of timeslots, but intended to provide a method for random access dependent upon a stipulation of the design and usage of the UpPTS timeslot in the frame structure.

The embodiments of the invention will be described below with reference to the drawings.

Figure 2:
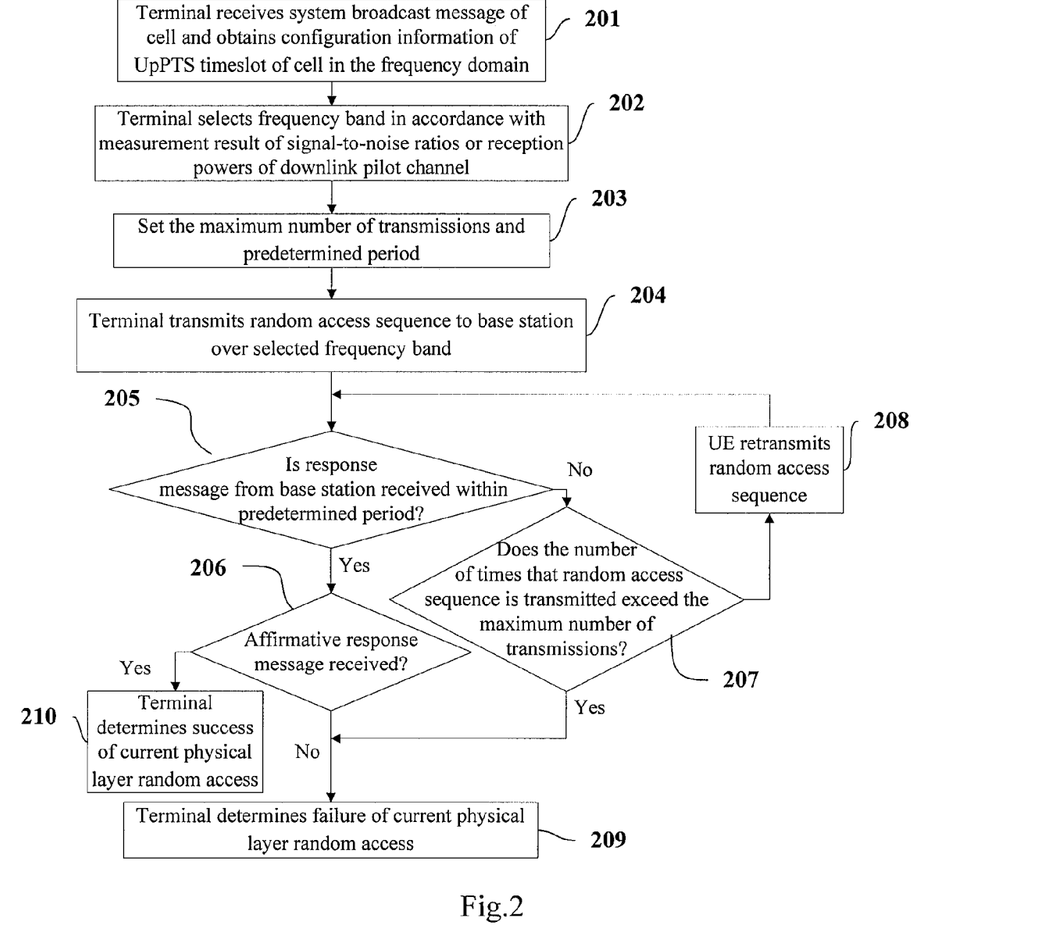
FIG. 2 illustrates a flow chart of a method for physical layer random access in a wideband time division duplex mobile communication system according to an embodiment of the invention.

FIG. 2 illustrates a flow chart of a method for physical layer random access in a wideband time division duplex mobile communication system according to an embodiment of the invention. As illustrated in FIG. 2, in the step 201, a terminal receives a system broadcast message of a cell and obtains configuration information in the frequency domain of the UpPTS timeslot of the cell. In the TD-SCDMA evolvement system, the system can support scaleable frequency band width configuration of, e.g., 5 MHz, 10 MHz, 15 MHz, 20 MHz, etc., or even smaller frequency bands of, e.g., 1.25 MHz, 2.5 MHz, etc. A cell supports different frequency band widths in different network development phrases, and supported frequency band widths vary from one cell to another. In order to support a random access of a terminal, it is necessary to divide a random access channel in the UpPTS timeslot of each cell into a plurality of frequency bands in the frequency domain, and thus a frequency band width of a random access sequence transmitted by the terminal during a random access can be defined within a frequency band, thereby making best use of a device capability of the terminal. The entire frequency band width of the UpPTS timeslot can either be divided equally or be divided into frequency bands with different bandwidths. The frequency band is divided for each cell in view of factors of an access capability of the terminal and the like. The configuration information of the UpPTS timeslot in the frequency domain particularly refers to information on the number of frequency bands into which the entire used bandwidth is divided for the UpPTS timeslot, information on bandwidths of the respective frequency bands, and information on frequency point locations of the respective frequency bands. The information can be broadcast in a system broadcast message throughout a coverage range of the cell, and the terminal can know the resource configuration of the UpPTS timeslot of the cell where it resides by receiving the system broadcast message and thereby can initiate a random access at any time. Division of the UpPTS timeslot in the frequency domain will be further discussed in following descriptions of the embodiments of the invention.

In the step 202, the terminal selects a frequency band in accordance with a measurement result of signal-to-noise ratios or reception powers of a downlink pilot channel. Since the TD-SCDMA evolvement system uses a relatively broad bandwidth, its pilot signal is transmitted throughout the entire frequency band width. Due to frequency selectivity of a wireless propagation environment, magnitudes of powers of the pilot signal received by the terminal may vary from one sub-frequency band to another. By measuring the signal-to-noise ratios and the received signal powers of the downlink pilot channel, a frequency band with better signal quality can be selected for an uplink random access, thereby guaranteeing good performance of the random access. The frequency band can also be selected in combination with an access capability of the terminal.

Alternatively, a relationship between UpPTS frequency band division and service priority or access priority can be established in advance. The service initiating terminal which requires a random access can select a corresponding frequency band in accordance with the service priority of a service to be initiated or the access priority of the terminal. The above two approaches can be combined to provide a more versatile random access function.

Figure 5:
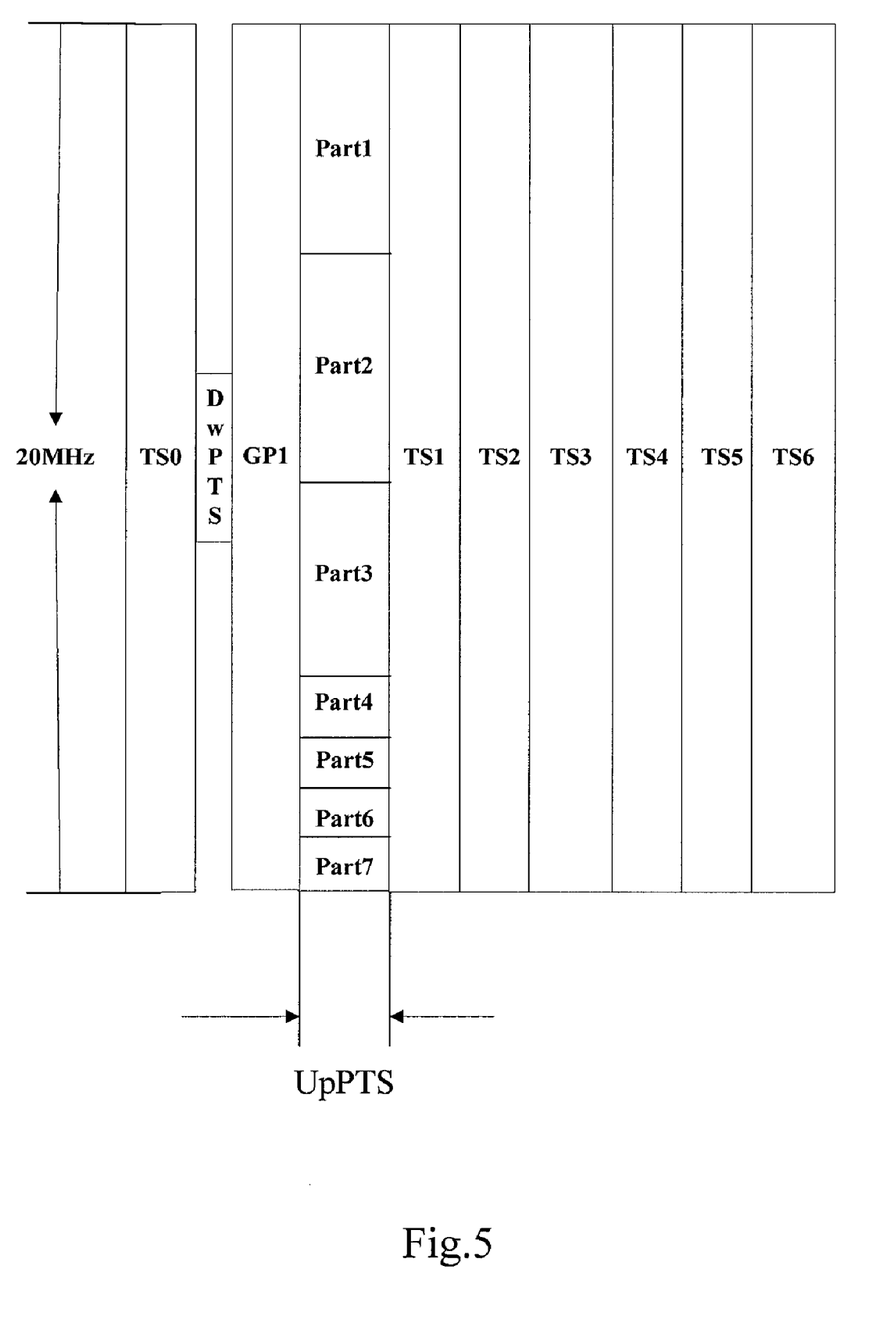
FIG. 5 illustrates a schematic diagram of UpPTS timeslot frequency band division according to another embodiment of the invention.

For the UpPTS random access channel with the same frequency band width divided, a frequency band can be selected randomly. For a terminal enabling a 20 MHz access and system bandwidth configuration as illustrated in FIG. 5, for example, the terminal selects randomly a frequency band among three 5 MHz frequency bands for transmission of a random access sequence. Alternatively, the terminal can determine a frequency band with the best frequency selectivity attenuation performance by measuring a downlink plot channel transmitted from the base station and transmit over this frequency band. For example, the terminal determines from a measurement result that the frequency band of Part3 has the best transmission quality and thus selects the frequency band of Part3 over which a random access sequence is transmitted.

For example, when bandwidths of 1.25 MHz, 2.5 MHz and 5 MHz are all available to a user, the terminal can select a sub-band channel of 5 MHz as an uplink random access channel in accordance with a terminal capability of the user (where a transmission bandwidth of the terminal is 5 MHz).

Then, some transmission parameters are set. In the step 203, the maximum number of transmissions and a predetermined time are set. Generally, the terminal will wait for a response message from the base station after transmitting the random access sequence to the base station to determine whether the access succeeds. If no response message from the base station is received, the random access sequence is typically retransmitted. The maximum number of transmissions is a limitation on the number of transmissions. When the number of transmissions is beyond the maximum number of transmissions, the terminal will not transmit the random access sequence any longer. Furthermore, the terminal may receive no response message after transmitting the random access sequence. At this time, the parameter of the predetermined period can be used to determine whether the random access sequence has been received by the base station after it is transmitted.

After selecting the corresponding access frequency band, the terminal transmits the random access sequence to the base station over the selected frequency band in the step 204. Prior to this, the terminal also selects the random access sequence. The random access sequence is generated in a specific way. For example, the random access sequence is generated from a single carrier by DFT-s OFDM or a traditional carrier. Each transmitted random access sequence represents a different terminal. The terminal selects a random access sequence from a set of random access sequences for transmission. The selection may be made in accordance with the priority of the random access sequence. In the TDD mode, the power to transmit the sequence can be obtained by measuring the downlink pilot signal, and the initial power for transmission can be obtained in view of symmetry of the channel.

After the transmission, the terminal will receive a response message from the base station. The response message is made by the base station upon reception of the random access sequence transmitted from the terminal. The base station processes the received random access sequence as follows.

Upon reception of the random access sequence transmitted from the terminal, the base station firstly matches and filters the received random access sequence with a set of codes to make a determination on the random access sequence transmitted from the terminal. Then, after the random access sequence transmitted from the terminal has been determined, the received random access sequence is interpolated, and an uplink synchronization deviation of the terminal is obtained, so that the terminal is instructed to adjust the temporal deviation in the response message transmitted to the terminal. Finally, the received random access sequence is detected, and it is determined whether there is a terminal which uses the same random access sequence for access. That is, collision detection is made. If a collision is detected, it proceeds with a collision processing flow. The collision processing flow will be described in details below.

After the above process, the base station may or may not transmit a response message to the terminal. For example, when the base station does not detect a collision, the base station can transmit to the terminal an affirmative response message indicating a success of the access and instruct the terminal to make a further adjustment on transmission of signal. When the base station detects a collision, the base station may not transmit a response message to the terminal and instead wait for retransmission from the terminal. If resources of the system are currently insufficient and no further access request can be accepted, the base station can transmit to the terminal a negative response message indicating a failure of the access. Particularly, the transmitted response message includes synchronization information and power control information.

Therefore, in the step 205, the terminal determines whether a response message from the base station is received within the predetermined period. If no response message from the base station is received within the predetermined period (e.g., 5 ms), then in the step 207, the terminal queries a counter which counts the number of times that the random access sequence is transmitted. The counter can be implemented by a software or hardware logic unit arranged in the terminal. The counter stores the number of times that the random access sequence is transmitted during the current uplink random access. When the number of transmissions is beyond the predetermined maximum number of transmissions, the system will not retransmit the random access any longer. Meanwhile, in the step 209, the terminal will determine a failure of the current physical layer random access. If the number of transmissions is not beyond the predetermined maximum number of transmissions, the terminal retransmits the random access sequence in the step 208. Preferably, a period of time will elapse prior to the retransmission to avoid collisions with other terminals.

If a response message from the base station is received within the predetermined period, it is further determined in the step 206 whether the received response message from the base station is an affirmative response message or not. The affirmative or negative response message is determined dependent upon a transmission protocol between the terminal and the base station. If the received response message is an affirmative response message, that is, the base station can communicate with the terminal transmitting the random access sequence code, then in the step 210, the terminal determines a success of the current physical layer random access and further proceeds with a subsequent process. If the received response message is a negative response message, that is, the base station rejects communication with the terminal transmitting the random access sequence code, then in the step 209, the terminal determines a failure of the current physical layer random access and also further proceeds with a corresponding subsequent process. The descriptions above are illustrative of the entire process for a physical layer random access of the terminal.

Preferably in the method above for physical layer random access, a power increment step is set. In the above retransmission process, the terminal increments the power to transmit the random access sequence by the magnitude of one step upon each retransmission, so that the power for each retransmission will be higher than that for previous transmission, thereby avoiding a disability of the base station to receive the random access sequence duo to insufficient power.

Figure 3:
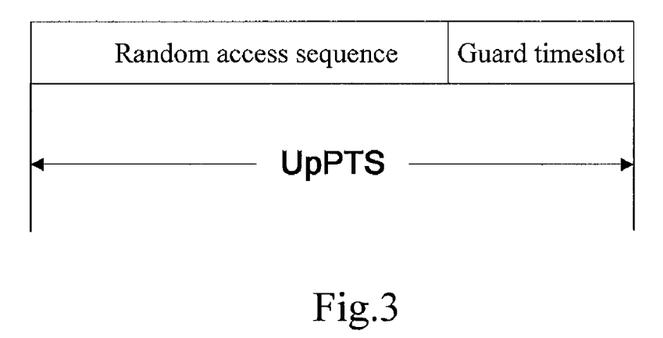
FIG. 3 illustrates a structural diagram of UpPTS timeslot arrangement according to an embodiment of the invention.

FIG. 3 illustrates a structural diagram of UpPTS timeslot arrangement according to an embodiment of the invention. The UpPTS timeslot is arranged in the wideband timeslot duplex cellular system according to the invention. The UpPTS timeslot includes two parts: one part is a random access sequence transmission period and the other is a guard period. The random access sequence transmission period is intended for transmission of the random access sequence selected by the terminal, and the guard period is intended for adjusting the random access sequence transmission period. When transmitting the random access sequence, the terminal can not determine accurately the time that the random access sequence reaches the base station because the distance of the terminal from the base station varies. In order to synchronize the times that signals transmitted from all the terminals reach the base station, the random access sequence transmission period can be adjusted within the guard period to satisfy the synchronization requirement.

In the invention, when transmission bandwidths of the wideband time division duplex cellular system are 1.25 MHz, 2.5 MHz and 5 MHz, the bandwidth of the UpPTS timeslot in the frequency domain can be divided into several parts each provided with a frequency bandwidth of 1.25 MHz. Thus, different users can send a random access sequence to the base station over different frequency bands.

Figure 4:
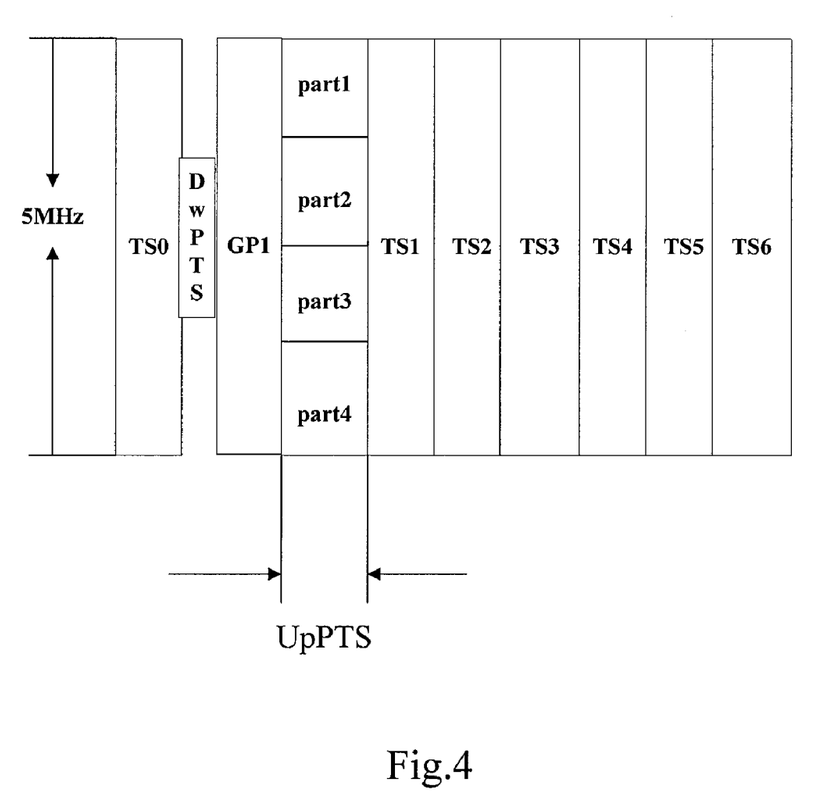
FIG. 4 illustrates a schematic diagram of UpPTS timeslot frequency band division according to an embodiment of the invention.

FIG. 4 illustrates a schematic diagram of UpPTS timeslot bandwidth division according to an embodiment of the invention. In the wideband time division duplex cellular system of this embodiment, the transmission bandwidth of the system is 5 MHz. The 5 MHz bandwidth in the UpPTS timeslot is divided equally into four parts each provided with a sub-band width of 1.25 MHz. A user in this cell can transmit a random access sequence for a random access over any sub-band width in the UpPTS timeslot.

A random channel can be selected randomly among random channels with the same sub-band width. In the case of random channels with different sub-band widths, the terminal can select a sub-band with the best frequency selectivity attenuation performance by measuring a downlink plot channel transmitted from the base station and transmit over the selected sub-band channel.

FIG. 5 illustrates a schematic diagram of UpPTS timeslot bandwidth division according to another embodiment of the invention. For a cell with system bandwidths of 10 MHz, 15 MHz and 20 MHz or others above 5 MHz, resources in its UpPTS timeslot can be divided into several different frequency bands in the frequency domain. The width of the frequency band may be 1.25 MHz or 5 MHz. FIG. 5 illustrates a schematic diagram of an embodiment for a system bandwidth of 20 MHz.

As illustrated in FIG. 5, resources of the UpPTS timeslot are divided into seven parts in the frequency domain, where Part1 to Part 3 denote frequency bands with a bandwidth of 5 MHz, and Part4 to Part7 denote frequency bands with a bandwidth of 1.25 MHz. A terminal in the cell can select the sub-band of 5 MHz or 1.25 MHz for transmission of a random access sequence in accordance with capability of the terminal. For example, the terminal enabling 5 MHz transmission can select the frequency band with the bandwidth of either 5 MHz or 1.25 MHz for a random access. When a random sequence is transmitted over the frequency band with the bandwidth of 5 MHz, the reception and determination performance of the base station can be enhanced, the power of the terminal to transmit a random access sequence is reduced, and power consumption and interference with an adjacent cell of the terminal is reduced. Therefore, the terminal typically selects the frequency band with the bandwidth of 5 MHz preferably as an uplink random access channel.

Figure 6:
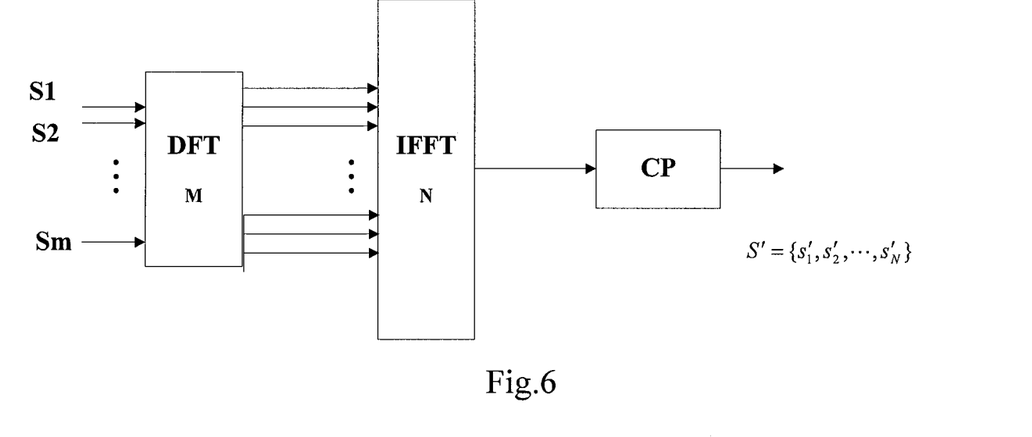
FIG. 6 illustrates a schematic diagram of a process of generating a random access sequence by DFT-s OFDM according to an embodiment of the invention.

FIG. 6 illustrates a schematic diagram of a process of generating a random access sequence by DFT-s OFDM according to an embodiment of the invention. A random access sequence for the UpPTS timeslot illustrated in FIG. 3 can be generated from a single carrier by DFT-s OFDM or a traditional signal carrier. In the case of a single carrier by DFT-s OFDM, a method for generating random access sequence is as illustrated in the figure.

It is assumed that a random sequence which is required to be transmitted by the MAC layer of the terminal is $S=\{s_1, s_2, \ldots, s_M\}$. The random sequence is transformed into a frequency-domain signal after a DFT process. The frequency-domain signal after being spectrum-spread in the frequency domain is input to an IFFT module to generate a random sequence in the time domain $S'=\{s'_1, s'_2, \ldots, s'_N\}$. The generated random sequence can be selected by the terminal as a random access sequence transmitted to the base station over a corresponding frequency band of the UpPTS timeslot.

A random access sequence transmitted over a random access sub-channel with a different bandwidth can be of a different length to adapt a corresponding bandwidth resource. For example, the lengths of the random access sequences transmitted over the random access sub-channels with frequency bandwidths of 1.25 MHz and 5 MHz are different. The length of the random access sequence transmitted over the sub-band channel of 5 MHz is 4 times that of 1.25 MHz.

Figure 7:
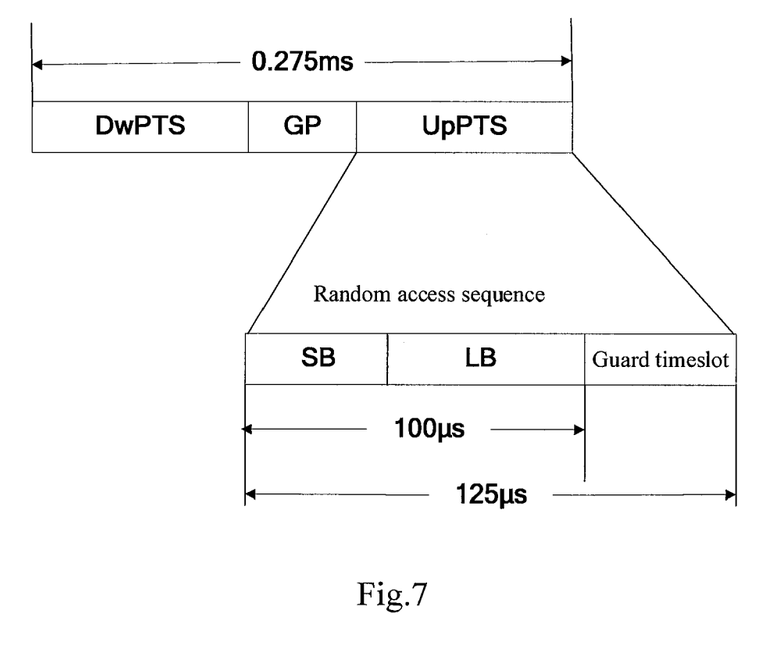
FIG. 7 illustrates a schematic diagram of a structure of the random access sequence generated by DFT-s OFDM.

FIG. 7 illustrates a schematic diagram of a structure of a random access sequence generated by DFT-s OFDM. If a random access sequence is generated by DFT-s OFDM, a structure of the UpPTS timeslot illustrated in FIG. 7 can be designed.

In FIG. 7, the random access sequence consists of SB and LB generated respectively by DFT-s OFDM, where the SB denotes a short block and the LB denotes a long block.

As illustrated in FIG. 7, the length of the SB is a half of that of the LB. This is because the length of IFFT used to generate the SB sequence is a half of that of IFFT for the LB. As illustrated in FIG. 7, the length of the SB is 33.3 μs and that of the LB is 66.6 μs. The random access sequence includes no CP (i.e., Cyclic Prefix) in this embodiment, but may include a CP in other embodiments.

Figure 8:
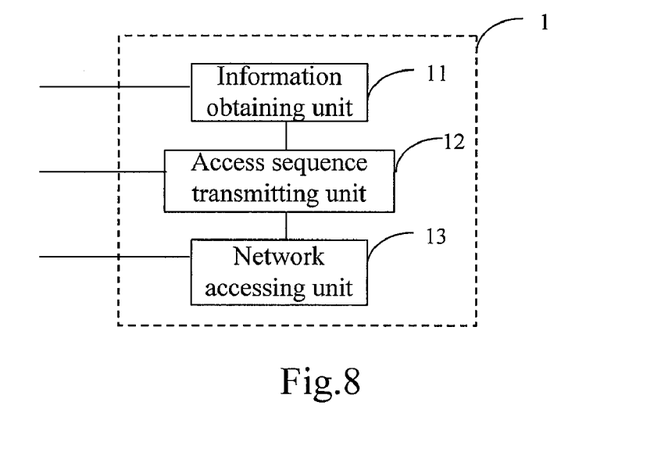
FIG. 8 illustrates a block diagram of a first embodiment of the device according to the invention.

FIG. 8 illustrates a block diagram of a first embodiment of the device according to the invention. In an application system of the embodiment in FIG. 8, there is an UpPTS uplink access timeslot, and the device 1 makes use of the UpPTS timeslot for a random access. The device 1 includes the following units.

An information obtaining unit 11 is adapted to receive a system broadcast message of a cell and to obtain configuration information on the UpPTS timeslot of the cell in the frequency domain.

An access sequence transmitting unit 12 is adapted to transmit a random access sequence to a base station in the UpPTS timeslot in accordance with the configuration information on the UpPTS timeslot in the frequency domain obtained from the information obtaining unit.

A network accessing unit 13 is adapted to receive a response message from the base station; and if no response message from the base station is received within a predetermined period, the terminal retransmits the random access sequence, and if a response message is received within the predetermined period, the terminal proceeds with a subsequent processing flow for the random access.

Figure 9:
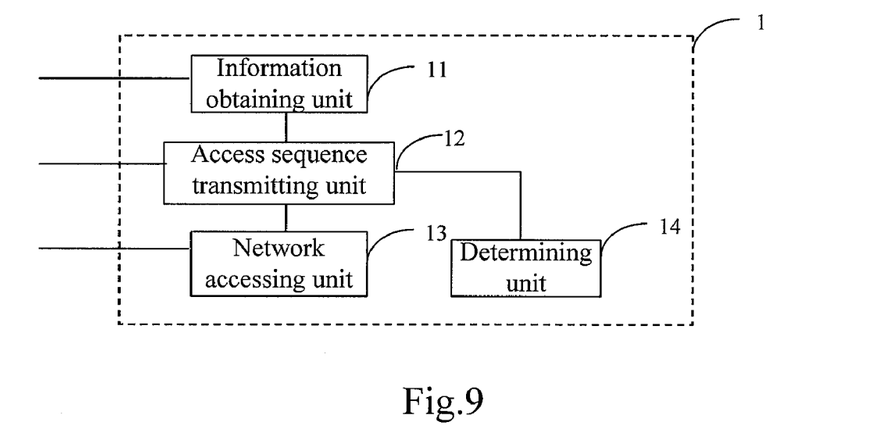
FIG. 9 illustrates a block diagram of a second embodiment of the device according to the invention.

FIG. 9 illustrates a block diagram of a second embodiment of the device according to the invention. The embodiment in FIG. 9 is different from that in FIG. 8 in that this embodiment further includes a determining unit 14 adapted to determine whether the number of times that the random access sequence is transmitted exceeds the maximum number of transmissions; and if the maximum number of transmissions is not exceeded, the terminal retransmits the random access sequence, and if the maximum number of transmissions is exceeded, a failure of the current physical layer random access is determined.

Figure 10:
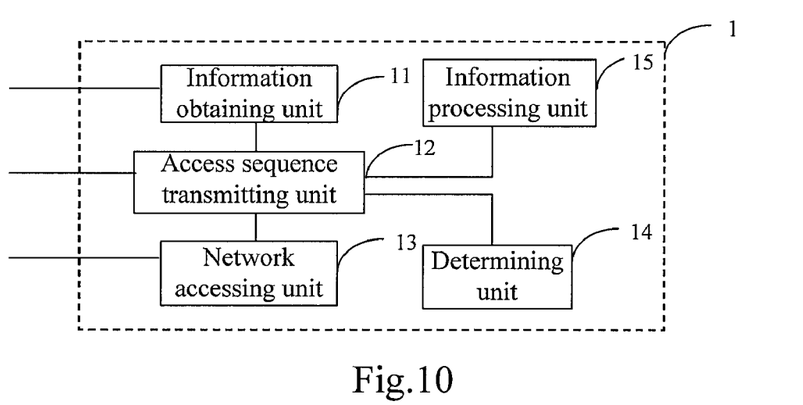
FIG. 10 illustrates a block diagram of a third embodiment of the device according to the invention.

FIG. 10 illustrates a block diagram of a third embodiment according to the invention. The embodiment in FIG. 10 is different from that in FIG. 9 in that this embodiment further includes an information processing unit 15 adapted to select a frequency band in accordance with a measurement result of signal-to-noise ratios or reception powers of a downlink pilot channel and to instruct the access sequence transmitting unit to transmit the random access sequence over the frequency band.

The information processing unit 15 can alternatively be configured to select a corresponding frequency band in accordance with service priority of its service to be initiated or its access priority and to instruct the access sequence transmitting unit to transmit the random access sequence over the frequency band.

Integration of any of the devices in FIG. 8 to FIG. 10 into a terminal can result in a terminal for the wideband time division duplex mobile communication system. Taking it as an example that a terminal in FIG. 8 is integrated, the physical layer random access device in the terminal includes the following units.

An information obtaining unit is adapted to receive a system broadcast message of a cell and to obtain configuration information on the UpPTS timeslot of the cell in the frequency domain.

An access sequence transmitting unit is adapted to transmit a random access sequence to a base station in the UpPTS timeslot in accordance with the configuration information on the UpPTS timeslot in the frequency domain obtained from the information obtaining unit.

A network accessing unit is adapted to receive a response message from the base station; and if no response message from the base station is received within a predetermined period, the terminal retransmits the random access sequence, and if a response message is received within the predetermined period, the terminal proceeds with a subsequent processing flow for the random access.

Obviously, if the device in FIG. 9 or FIG. 10 is integrated into the terminal, the terminal may have further improved performance.

Details of implementing the device and system according to the invention have been described above with reference to the method according to the invention and therefore will not be repeated here.

Although the above embodiments of the invention have been disclosed, these embodiments are not intended to limit the invention. Those skilled in the art can make variations and modifications thereto without departing from the spirit and scope of the invention, and accordingly the scope of the invention shall be defined in the appended claims.

What is claimed is:

1. A method for physical layer random access in a wideband time division duplex mobile communication system in which there is an UpPTS uplink access timeslot for random access, wherein the method comprises:
    a) receiving a system broadcast message of a cell, and obtaining frequency band configuration information on the UpPTS timeslot of the cell in the frequency domain;
    b) transmitting a random access sequence to a base station in the UpPTS timeslot in accordance with the frequency band configuration information on the UpPTS timeslot in the frequency domain; and
    c) retransmitting the random access sequence if no response message from the base station is received within a predetermined period; and
    proceeding with a subsequent processing flow for the random access if a response message is received within the predetermined period,
    wherein the frequency band configuration information on the UpPTS timeslot in the frequency domain comprises information on the number of frequency bands into which the UpPTS timeslot is divided over the entire used bandwidth, information in bandwidths of the respective frequency bands, and information on frequency point locations of the respective frequency bands.

2. The method for physical layer random access in a wideband time division duplex mobile communication system according to claim 1, wherein the transmitted random access sequence occupies one of the frequency bands in the frequency domain.

3. The method for physical layer random access in a wideband time division duplex mobile communication system according to claim 1, wherein the bandwidth used for the system is divided equally into the bandwidths of the respective frequency bands of the UpPTS timeslot.

4. The method for physical layer random access in a wideband time division duplex mobile communication system according to claim 3, wherein when the entire bandwidth used for the system is 5 MHz, the UpPTS timeslot is divided into four frequency bands each with a bandwidth of 1.25 MHz in the frequency domain.

5. The method for physical layer random access in a wideband time division duplex mobile communication system according to claim 1, wherein the UpPTS timeslot is divided unequally into the bandwidths of the respective frequency bands.

6. The method for physical layer random access in a wideband time division duplex mobile communication system according to claim 5, wherein when the entire bandwidth used for the system is 10 MHz, 15 MHz or 20 MHz, a 5 MHz bandwidth in the bandwidth is divided equally into four frequency bands each with a bandwidth of 1.25 MHz, and the remaining bandwidth is divided into a frequency band with a bandwidth of 5 MHz.

7. The method for physical layer random access in a wideband time division duplex mobile communication system according to claim 1, wherein the random access sequence transmitted in the step b) is generated by transforming a random sequence S into the frequency domain by Discrete Fourier Transform, spectrum-spreading the random sequence, transforming the random sequence by Inverse Discrete Fourier Transform into a random sequence S' in the time domain, and transmitting the random sequence to a selected frequency band in the UpPTS timeslot.

8. The method for physical layer random access in a wideband time division duplex mobile communication system according to claim 7, wherein the random access sequence S' comprises two parts of SB and LB, and the length of the SB is shorter than that of the LB.

9. The method for physical layer random access in a wideband time division duplex mobile communication system according to claim 1, wherein in the step c), it is determined whether the number of times that the random access sequence is transmitted exceeds the maximum number of transmissions; and if the maximum number of transmissions is not exceeded, a terminal retransmits the random access sequence, and if the maximum number of transmissions is exceeded, the terminal determines a failure of the current physical layer random access.

10. The method for physical layer random access in a wideband time division duplex mobile communication system according to claim 1, wherein the affirmative response message comprises synchronization information and power control information.

11. The method for physical layer random access in a wideband time division duplex mobile communication system according to claim 1, wherein in the step b), a frequency band is selected for transmission of the random access sequence in accordance with a measurement result of signal-to-noise ratios or reception powers of a downlink pilot channel.

12. The method for physical layer random access in a wideband time division duplex mobile communication system according to claim 1, wherein in the step b), a corresponding frequency band is selected for transmission of the random access sequence in accordance with service priority of a service to be initiated or access priority.

13. A device for physical layer random access in a wideband time division duplex mobile communication system, comprising:
an information obtaining unit adapted to receive a system broadcast message of a cell and to obtain frequency band configuration information on an UpPTS timeslot of the cell in the frequency domain;
an access sequence transmitting unit adapted to transmit a random access sequence to a base station in the UpPTS timeslot in accordance with the frequency band configuration information on the UpPTS timeslot in the frequency domain obtained from the information obtaining unit; and
a network accessing unit adapted to receive a response message from the base station; and if no response message from the base station is received within a predetermined period, a terminal retransmits the random access sequence, and if a response message is received within the predetermined period, the terminal proceeds with a subsequent processing flow for the random access,
wherein the frequency band configuration information on the UpPTS timeslot in the frequency domain comprises information on the number of frequency bands into which the UpPTS timeslot is divided over the entire used bandwidth, information on bandwidths of the respective frequency bands, and information on frequency point locations of the respective frequency bands.

14. The device for physical layer random access in a wideband time division duplex mobile communication system according to claim 13, further comprising a determining unit adapted to determine whether the number of times that the random access sequence is transmitted exceeds the maximum number of transmissions; and if the maximum number of transmissions is not exceeded, the terminal retransmits the random access sequence, and if the maximum number of transmissions is exceeded, a failure of the current physical layer random access is determined.

15. The device for physical layer random access in a wideband time division duplex mobile communication system according to claim 14, further comprising an information processing unit adapted to select a frequency band in accordance with a measurement result of signal-to-noise ratios or reception powers of a downlink pilot channel and to instruct the access sequence transmitting unit to transmit the random access sequence over the frequency band.

16. The device for physical layer random access in a wideband time division duplex mobile communication system according to claim 14, further comprising an information processing unit adapted to select a corresponding frequency band in accordance with service priority of a service to be initiated or access priority and to instruct the access sequence transmitting unit to transmit the random access sequence over the frequency band.

17. A terminal for a wideband time division duplex mobile communication system, comprising a device for physical layer random access comprising:
an information obtaining unit adapted to receive a system broadcast message of a cell and to obtain frequency band configuration information on an UpPTS timeslot of the cell in the frequency domain;
an access sequence transmitting unit adapted to transmit a random access sequence to a base station in the UpPTS timeslot in accordance with the frequency band configuration information on the UpPTS timeslot in the frequency domain obtained from the information obtaining unit; and
a network accessing unit adapted to receive a response message from the base station; and if no response message from the base station is received within a predetermined period, a terminal retransmits the random access sequence, and if a response message is received within the predetermined period, the terminal proceeds with a subsequent processing flow for the random access, wherein the frequency band configuration information on the UpPTS timeslot in the frequency domain comprises information on the number of frequency bands into which the UpPTS timeslot is divided over the entire used bandwidth, information on bandwidths of the respective frequency bands, and information on frequency point locations of the respective frequency bands.

* * * * *